United States Patent
Guo et al.

(10) Patent No.: US 12,449,047 B2
(45) Date of Patent: Oct. 21, 2025

(54) ELECTRIC SHUNT VALVE WITH MULTI-STAGE FLOW CONTROL

(71) Applicant: Guangzhou Rising Dragon Recreation Industrial Co., Ltd., Guangzhou (CN)

(72) Inventors: Ziqin Guo, Guangzhou (CN); Bo Liang, Guangzhou (CN)

(73) Assignee: GUANGZHOU RISING DRAGON RECREATION INDUSTRIAL CO., LTD., Guangzhou (CN)

( * ) Notice: Subject to any disclaimer, the term of this patent is extended or adjusted under 35 U.S.C. 154(b) by 93 days.

(21) Appl. No.: 18/590,963

(22) Filed: Feb. 29, 2024

(65) Prior Publication Data

US 2025/0122938 A1    Apr. 17, 2025

(30) Foreign Application Priority Data

Oct. 13, 2023   (CN) .......................... 202322749841.X (51) Int. Cl.
*F16K 11/085*    (2006.01)
(52) U.S. Cl.
CPC ................................ *F16K 11/0856* (2013.01)
(58) Field of Classification Search
CPC ............... F16K 11/0856; F16K 11/076; F16K 37/0058; F16K 11/085
See application file for complete search history.

(56) References Cited

U.S. PATENT DOCUMENTS

| | | | | |
|---|---|---|---|---|
| 5,278,530 A | * | 1/1994 | Zovath | H01H 36/00 335/185 |
| 11,339,895 B2 | * | 5/2022 | Brown | F16K 37/0041 |
| 11,359,743 B2 | * | 6/2022 | Liu | H02K 7/14 |
| 11,662,040 B2 | * | 5/2023 | Liu | F16K 37/0041 137/554 |
| 2007/0044856 A1 | * | 3/2007 | Bonior | F16K 11/0856 137/625.47 |

* cited by examiner

*Primary Examiner* — Michael R Reid
(74) *Attorney, Agent, or Firm* — Frank Niranjan (57) ABSTRACT

The application provides an electric shunt valve with multi-stage flow control. The brushless DC motor is controlled by a controller to perform phase rotation to drive the connector and the valve core to selectively rotate forward and backward relative to the valve body; by arranging a color wheel to cooperate with a PCB circuit board including a color sensor and a white LED lamp, white light of the white LED is irradiated onto the color wheel through a light pipe A, and light corresponding color is reflected and transmitted to the color sensor through a light pipe B; the color sensor generates corresponding electrical signals through the color of the received light and transmits the electrical signals to the PCB circuit board, the absolute position of the rotating shaft is accurately determined and fed back to the controller and the water outlet ratio of different water outlet holes is obtained.

7 Claims, 7 Drawing Sheets

ELECTRIC SHUNT VALVE WITH MULTI-STAGE FLOW CONTROL

TECHNICAL FIELD

The application relates to the application field of an electric shunt valve, in particular to an electric shunt valve for a bathtub with multi-stage flow control.

BACKGROUND

In the process of using the bathtub, a shunt valve is often used to adjust the flow ratio of hot and cold water to control the water temperature of the bathtub, and the flow and pressure of the water flow are controlled by the opening degree of the shunt valve to make the water flow soft or strong to meet different bathing needs.

However, at present, the shunt valves commonly used in the bathtub field include manual shunt valves and electric shunt valves. The manual shunt valve not only needs great efforts to twist the valve core, but also is difficult to accurately adjust the water output by manual adjustment, and the knob of the manually regulated valve and the valve core must be coaxially connected, occupying a large space.

Therefore, the electric shunt valve gradually occupies an important position in the use of shunt valves for bathtubs. The electric shunt valve mostly uses a motor to drive the valve core to rotate at a certain angle to control the water output of the water outlet, so as to realize the water control. How to accurately control the rotation angle of the valve core driven by the motor has become a technical problem that must be solved to realize accurate control of water output. Therefore, it is necessary to provide an electric shunt valve which can detect the rotation angle of the valve core and accurately adjust the water flow to ensure the accuracy of control of the shunt valve.

SUMMARY

In view of the problem of low accuracy of regulating the water flow of a shunt valve in the prior art, the application provides an electric shunt valve which realizes multi-stage accurate control of the water quantity of the water outlet hole by electric driving.

An electric shunt valve with multi-stage flow control, comprising a controller, a brushless DC motor, a valve core and a valve body, wherein the valve core comprises a water inlet hole and a plurality of water outlet holes, and the valve body comprises a water inlet interface pipe and water outlet interface pipes corresponding to the water outlet holes one by one; wherein the electric shunt valve further comprising a PCB circuit board which is fixedly arranged, a light guide plate, a color sensor and a white LED lamp which are arranged on the PCB circuit board; the controller is electrically connected with the PCB circuit board and the brushless DC motor in turn, a rotating shaft of the brushless DC motor is detachably connected with the valve core through a connector; a color wheel is fixedly arranged on the rotating shaft, the light guide plate is positioned between the PCB circuit board and the color wheel; a light pipe A and a light pipe B are arranged on the light guide plate, and the light pipe A is positioned directly below the white LED lamp and the light pipe B is positioned directly below the color sensor; a white light of the white LED is irradiated onto the color wheel through the light pipe A, and a light of a corresponding color is reflected and transmitted to the color sensor through the light pipe B; the color sensor generates a corresponding electrical signal through the color of the received light and transmits the electrical signal to the PCB circuit board, and the PCB circuit board obtains an absolute position of the rotating shaft currently according to the received electrical signal and feeds the absolute position back to the controller; the controller controls the brushless DC motor to perform phase rotation to drive the connector and the valve core to selectively rotate forward and backward relative to the valve body, so as to realize multi-level control of water flow corresponding to the water outlet holes.

Preferably, wherein the controller is a touch controller comprising a touch panel and a control circuit board; the touch panel is provided with a plurality of gear buttons, and the control circuit board is electrically connected with the PCB circuit board and the brushless DC motor in turn.

Preferably, wherein a plurality of color blocks with different colors are uniformly arranged along a circumference of the color wheel, and the color blocks correspond to the gear buttons one by one.

Preferably, further comprising a waterproof case for accommodating the brushless DC motor and the PCB circuit board; the waterproof case is installed in the valve body and comprises a box body and a cover body, and an O-shaped sealing ring is arranged between the cover body and the box body.

Preferably, wherein the valve body is matched with a lock nut to clamp and fix the waterproof case between the valve body and the lock nut.

Preferably, wherein a bottom of the waterproof case is provided with a connecting through hole, and the valve core is provided with a connecting part, which penetrates through the connecting through hole and is connected with the connector in a limited way.

Preferably, wherein a star-shaped sealing ring is arranged between the connecting part of the valve core and the connecting through hole of the waterproof case.

The application has the beneficial effects that: the application provides an electric shunt valve with multi-stage flow control, the controller controls the brushless DC motor to perform phase rotation to drive the connector and the valve core to selectively rotate forward and backward relative to the valve body; at the same time, the color wheel is matched with the PCB circuit board including the color sensor and the white LED lamp, and the white light of the white LED is irradiated onto the color wheel through a light pipe A, and the light of the corresponding color is reflected and transmitted to the color sensor through a light pipe B; the color sensor generates corresponding electrical signals through the color of the received light and transmits the electrical signals to the PCB circuit board, so that the absolute position of the rotating shaft can be accurately determined and fed back to the controller, the rotating absolute positions of the rotating shaft and the valve core can be clearly determined, and the water outlet ratio of different water outlet holes can be obtained, which is convenient for users to adjust the water flow in multiple stages according to requirements.

REFERENCE SIGNS

1, Controller; 101, Touch panel; 102, Control circuit board; 103, Mounting seat; 104, Lock nut; 105, Base; 2, Brushless DC motor; 3, Valve core; 301, Connecting part; 302, Water inlet hole; 303, 304, Water outlet hole; 4, Valve body; 401, Water inlet interface pipe; 402, 403, Water outlet interface pipe; 5, PCB circuit board; 501, Color sensor; 502, White LED lights; 6, Rotating shaft; 7, Connector; 701, Connection head; 702, Adapter; 7021, Drop-shaped shoulder 8, Color wheel; 801, Color block; 9, Mounting bottom plate; 91, Screw; 10, O-shaped sealing ring; 11, Box body; 111, Connecting through hole; 112, Thread groove; 12, Cover body; 13, Port waterproof part; 14, Connecting wire; 15, Second O-shaped sealing ring; 16, Star-shaped sealing ring; 17, Mounting stand; 18, First lock nut; 19, Light guide plate; 191, Light pipe A; 192, Light pipe B.

DESCRIPTION OF EMBODIMENTS

In order to make the technical problems, technical solutions and beneficial effects solved by the application more clear, the application will be further explained in detail with the attached drawings and embodiments. It should be understood that the specific embodiments described here are only used to explain the application, and are not used to limit the application.

Referring to FIG. 1, FIG. 2, FIG. 3 and FIG. 7, an electric shunt valve with multi-stage flow control includes a controller 1, a brushless DC motor 2, a valve core 3 and a valve body 4. The valve core 3 has a connecting part 301, a water inlet hole 302 and two water outlet holes 303 and 304, and the water outlet holes 303 and 304 are distributed up and down along the axis and staggered by a certain phase angle. According to the requirements of practical application, there may a plurality of water outlet holes, and the valve body 4 of the valve core 3 is provided with a water inlet interface pipe 401 and a water outlet interface pipe 402 corresponding to the water inlet hole and the water outlet hole, wherein the water outlet interface pipes 402 and 403 are distributed up and down along the axis.

Specifically, as shown in FIG. 1, FIG. 2, FIG. 3 and FIG. 8, the electric shunt valve provided by the application further includes a PCB circuit board 5 fixedly arranged, a light guide plate 19, a color sensor 501 and a white LED lamp 502 arranged on the PCB circuit board 5. The controller 1 is electrically connected with the PCB circuit board 5 and the brushless DC motor 2 in turn. A rotating shaft 6 of the brushless DC motor 2 is detachably connected with the valve core 3 through a connector 7, and a color wheel 8 is fixedly arranged on the rotating shaft 6. The light guide plate 19 is located between the PCB circuit board 5 and the color wheel 8, and the light guide plate 19 is provided with a light pipe A191 and a light pipe B192. The light pipe A191 is located directly below the white LED lamp 502, and the light pipe B192 is located directly below the color sensor 501; the white light of the white LED lamp 502 is irradiated onto the color wheel 8 through the light pipe A191, and the light of corresponding color is reflected and transmitted to the color sensor 501 through the light pipe B192; the color sensor 501 generates corresponding electrical signals according to the color of the received light and transmits them to the PCB circuit board 5, and the PCB circuit board 5 obtains the current absolute position of the rotating shaft 6 according to the received electrical signals and feeds the absolute position back to the controller 1; a user controls the brushless DC motor 2 to perform phase rotation through the controller 1 to drive the connector 7 and the valve core 3 to selectively rotate forward and backward relative to the valve body 4, so as to realize multi-stage accurate control of water flow corresponding to the water outlet holes 303 and 304.

Figure 9:
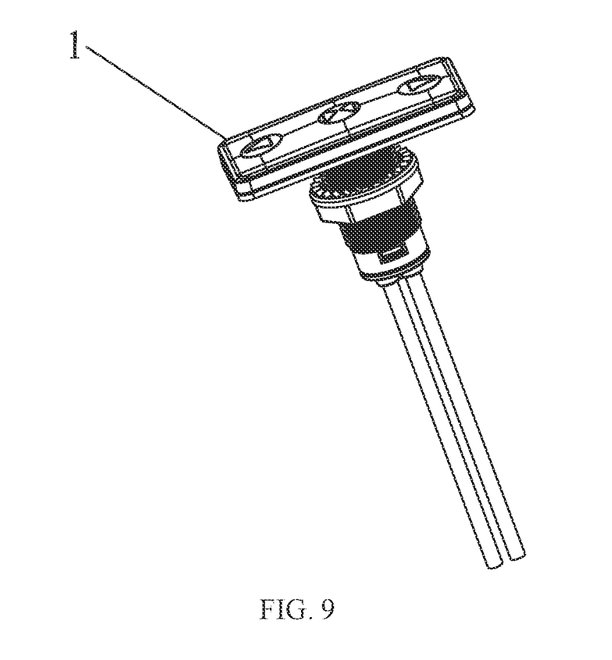
FIG. 9 is a schematic diagram of the three-dimensional structure of the controller provided by the application.
Figure 10:
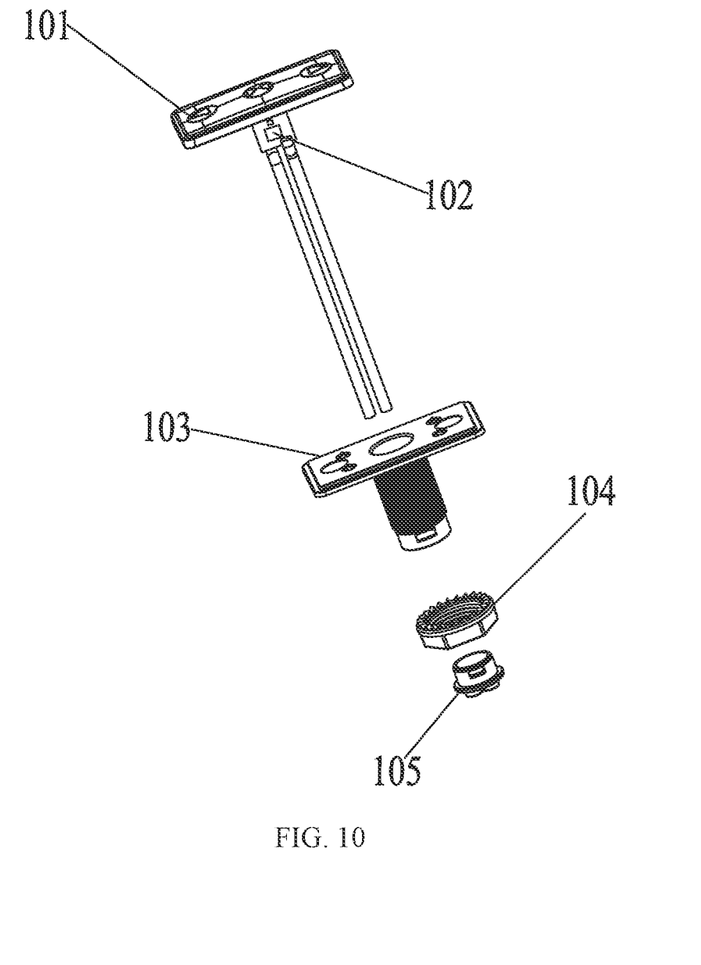
FIG. 10 is an exploded view of the controller in FIG. 9.

Wherein, the controller 1 shown in FIGS. 9 and 10 is a touch controller, which includes a touch panel 101, a control circuit board 102, a mounting seat 103, a lock nut 104 and a base 105, wherein the touch panel 101 is provided with a plurality of gear buttons, and the control circuit board 102 is electrically connected with the PCB circuit board 5 and the brushless DC motor 2 in turn, and the mounting seat 103 is matched with the lock nut 104 to fix the touch controller on an installation base body. A plurality of color blocks 801 with different colors are uniformly arranged on the color wheel 8 along the circumferential direction, and the color blocks 801 correspond to the shift buttons one by one.

Figure 8:
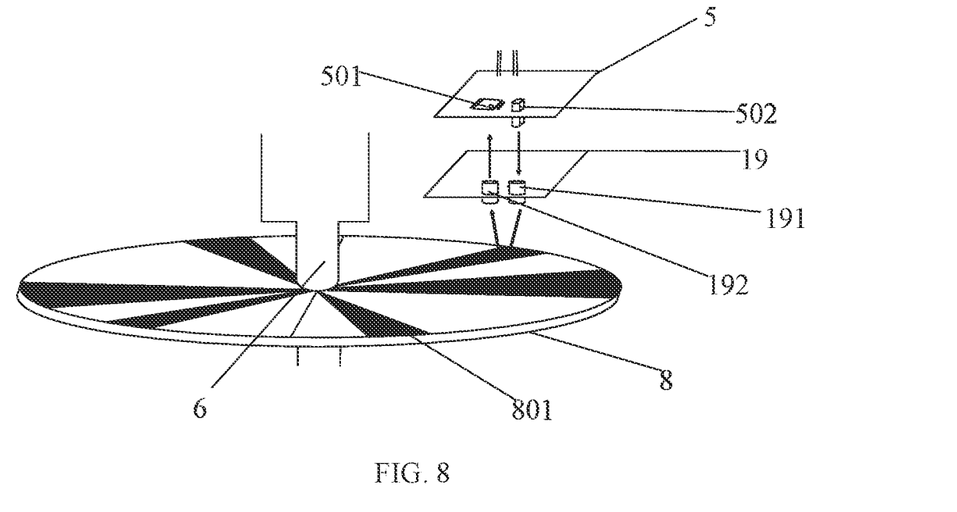
FIG. 8 is a schematic structural diagram of a PCB circuit board, a light guide plate and a color wheel provided by the application.

The light pipe A191 and the light pipe B192 play the roles of guiding and conducting light, and the light pipe A191 can effectively transmit the white light emitted by the white LED lamp 502 from the light source to the color wheel 8; under the irradiation of white light, different color samples on the color wheel 8 will reflect light rays in the corresponding colors and absorb light rays in other colors. The light pipe B can transmit the light of the corresponding color reflected by the color wheel 8 back to the color sensor 501, and the characteristics of the light are analyzed and measured by the color sensor 501 to judge what the reflected color is, so as to determine the absolute position of the rotation of the rotating shaft 6.

By touching the gear buttons, the user can select the gear corresponding to the water flow of the water outlet holes 303 and 304, and the color blocks 801 correspond to the gear buttons one by one. When the gear is selected, the control circuit board 102 controls the brushless DC motor 2 to perform phase rotation. At this time, the rotating shaft 6 of the brushless DC motor 2 drives the connector 7 and the valve core 3 to selectively rotate forward and backward relative to the valve body 4. During the rotation of the rotating shaft 6, the white light of the white LED lamp 502 is irradiated onto the color wheel 8 through the light pipe A191, and the light of the corresponding color is reflected and transmitted to the color sensor 501 through the light pipe B192. The absolute position of the current rotating shaft 6 is continuously obtained and fed back to the controller 1. When the rotating shaft 6 drives the color wheel 8 to rotate to the relative position of the square color block 801 corresponding to the gear, the color sensor 501 receives and transmits the electric signal of the light corresponding to the color of the color block 801 to the PCB circuit board 5, and the rotation stops, thus realizing the regulation of the water flow corresponding to the water outlet holes 303 and 304.

With reference to FIG. 2, FIG. 3, FIG. 4, FIG. 5 and FIG. 6, the electric shunt valve provided by the application further includes a waterproof case (not shown in the figure) for accommodating the brushless DC motor 2 and the PCB circuit board 5. The waterproof case is clamped and installed on the valve body 4 through a first lock nut 18, and includes a box body 11 and a cover body 12, and an O-shaped sealing ring 10 is arranged between the cover body 12 and the box body 11.

Figure 5:
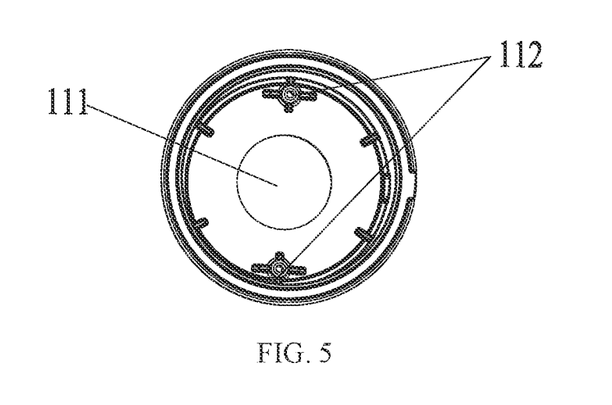
FIG. 5 is a waterproof case perspective view of the electric shunt valve with multi-stage flow control provided by the application.

The bottom of the box body 11 is provided with a connecting through hole 111, and the inner end surface of the box body 11 near the bottom is provided with a thread groove 112. The brushless DC motor 2 and the PCB circuit board 5 are fixedly installed on a mounting bottom plate 9, which is fixedly installed in the box body 11 through the cooperation of the screw 901 and the thread groove 112, so that the brushless DC motor 2 and the PCB circuit board 5 are fixedly installed in the box body 11. The valve core 3 has a connecting part 301, and the connecting part 301 passes through the connecting through hole 111 and is connected with the connector 7 in a limited way.

Figure 6:
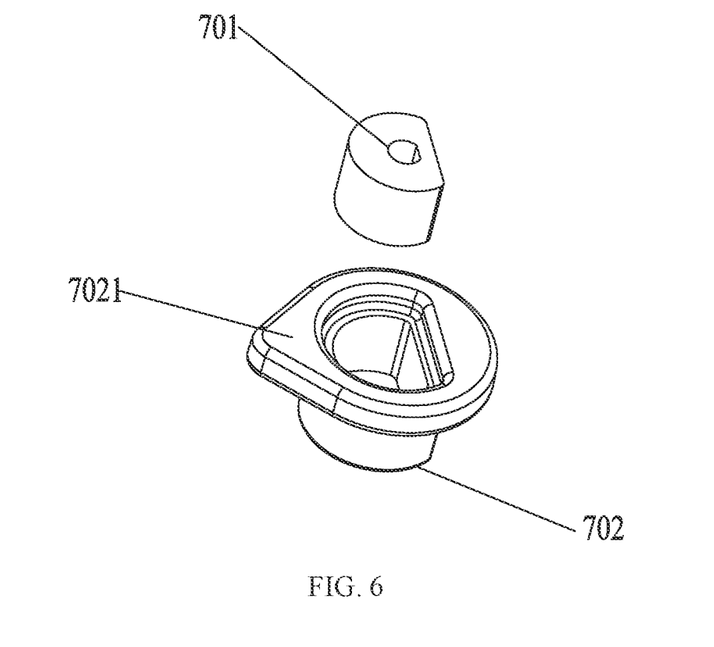
FIG. 6 is an exploded view of the connector of an electric shunt valve with multi-stage flow control provided by the application.
Figure 7:
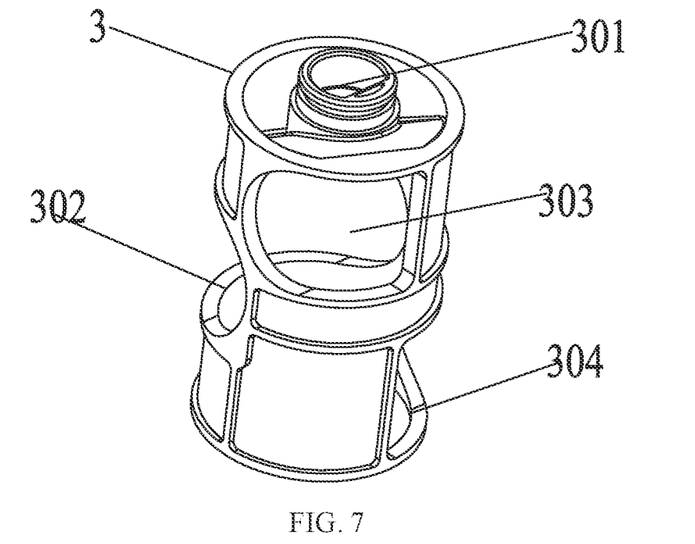
FIG. 7 is a valve core view of the electric shunt valve with multi-stage flow control provided by the application.

The connector 7 includes an adapter 702 and a connection head 701 embedded in the adapter 702. The adapter 702 is connected with a D-shaped counterbore on the connecting part 301 of the valve core 3 in a limited way, and the connector 701 is also D-shaped. The connector 701 is connected with the milled rotating shaft 6 in a flat position. In addition, one end of the adapter 702 near the brushless DC motor has a drop-shaped shoulder 7021.

Figure 1:
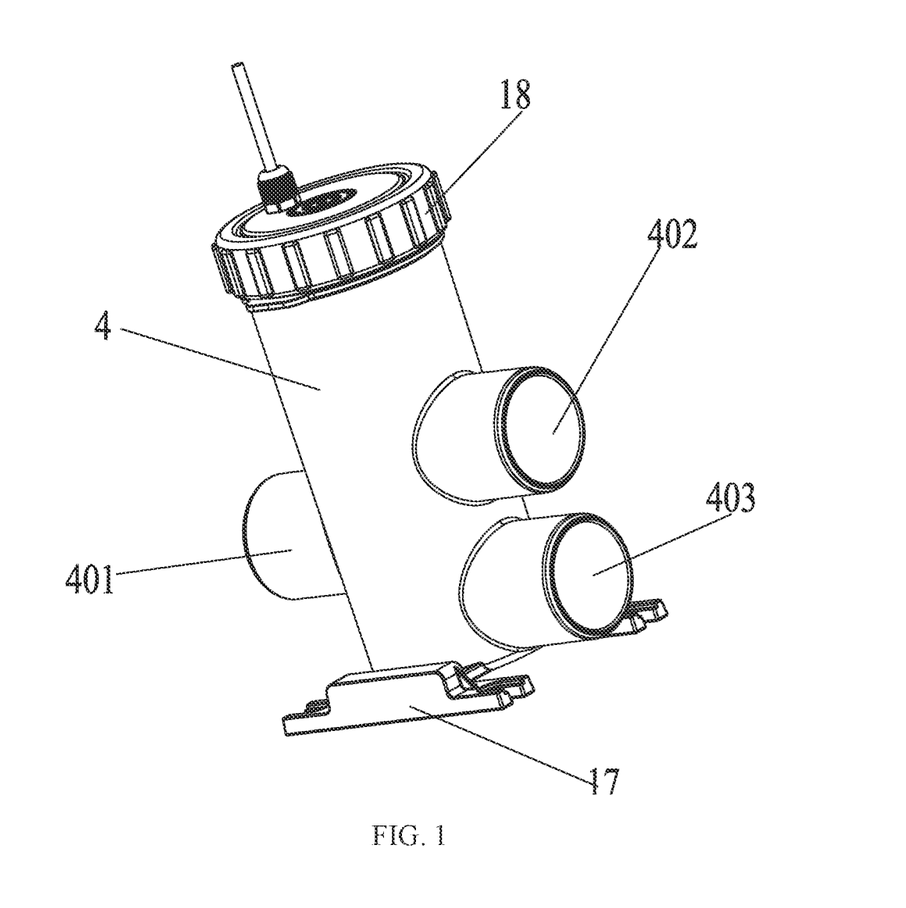
FIG. 1 is a schematic diagram of the three-dimensional structure of a hidden controller of an electric shunt valve with multi-stage flow control provided by the application.
Figure 2:
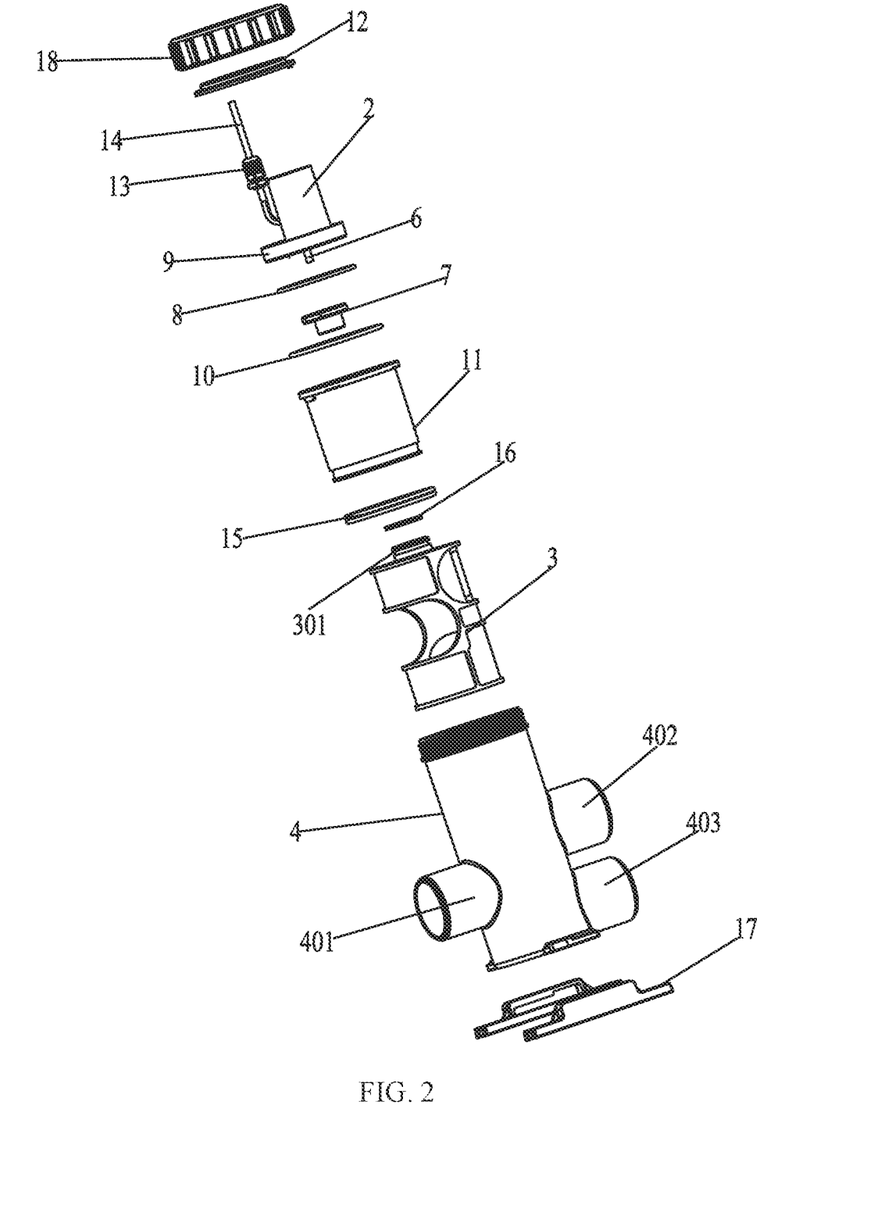
FIG. 2 is an explosion diagram of the hidden controller of the electric shunt valve with multi-stage flow control provided by the application.
Figure 3:
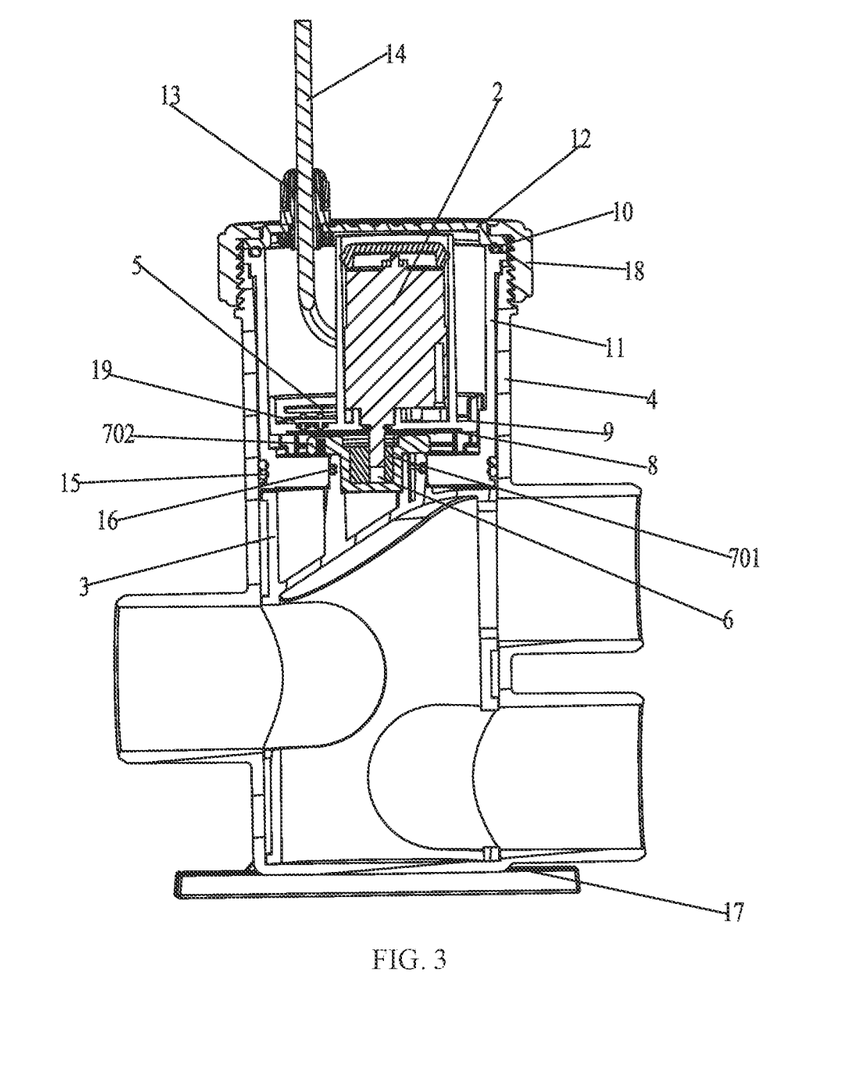
FIG. 3 is a sectional view of the hidden controller of the electric shunt valve with multi-stage flow control provided by the application.
Figure 4:
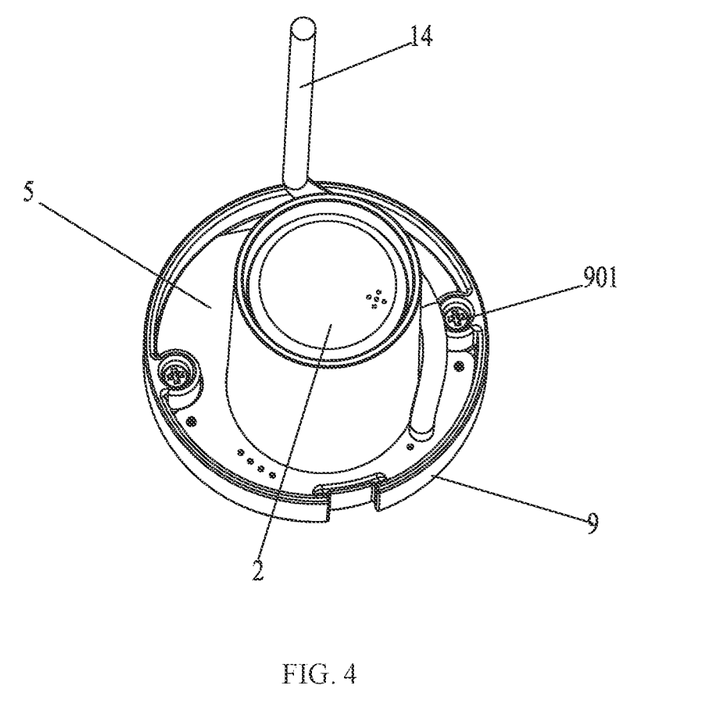
FIG. 4 is a partial structural perspective view of an electric shunt valve with multi-stage flow control provided by the application.

Combining FIG. 2 and FIG. 3, due to the use environment of the electric shunt valve, it is necessary to waterproof the device itself. For the waterproof protection problem of the electric shunt valve, in this embodiment, firstly, the port where the connecting wire 14 leads into waterproof case is waterproof sealed by setting a port waterproof part 13; secondly, an O-shaped sealing ring 10 is arranged in the installation gap between the cover body 12 and the box body 11; then, a second O-shaped sealing ring 15 is also arranged between the waterproof case and the valve body 4; finally, a star-shaped sealing ring 16 is arranged in the installation gap between the connecting part 301 of the valve core 3 and the connecting through hole 111 of the box body 11, thereby realizing the waterproof protection of the brushless DC motor 2 and the PCB circuit board 5.

Referring to FIGS. 2 and 3, further, the valve body 4 is provided with a mounting stand 17.

The application provides an electric shunt valve with multi-stage flow control. The controller 1 controls the brushless DC motor 1 to perform phase rotation to drive the connector 7 and the valve core 3 to selectively rotate forward and backward relative to the valve body 4. At the same time, the color wheel 8 is matched with the PCB circuit board 5 including the color sensor 501 and the white LED lamp 502, and the white light of the white LED lamp 502 is irradiated onto the color wheel 8 through the light pipe A191. The light of corresponding color is reflected and transmitted to the color sensor 501 through the light pipe B192. The color sensor 501 generates corresponding electrical signals according to the color of the received light and transmits them to the PCB circuit board 5, so that the absolute position of the rotating shaft 6 can be accurately determined and fed back to the controller 1. The rotating absolute positions of the rotating shaft 6 and the valve core 3 can be clearly determined, and different water outlet ratios of water outlet holes 303 and 304 can be obtained, which is convenient for users to accurately adjust the water flow in multiple stages according to requirements.

The above is only a preferred embodiment of this utility model. It should be pointed out that the above preferred embodiment should not be regarded as a limitation on this utility model, and the scope of protection of this utility model shall be subject to the scope defined by the claims. For those skilled in the art, several improvements and retouching can be made without departing from the spirit and scope of the application, and these improvements and embellishments shall also be regarded as within the protection scope of the application.

What is claimed is:

1. An electric shunt valve with multi-stage flow control, comprising a controller, a brushless DC motor, a valve core and a valve body, wherein the valve core comprises a water inlet hole and a plurality of water outlet holes, and the valve body comprises a water inlet interface pipe and water outlet interface pipes corresponding to the water outlet holes one by one; wherein the electric shunt valve further comprising a PCB circuit board which is fixedly arranged, a light guide plate, a color sensor and a white LED lamp which are arranged on the PCB circuit board; the controller is electrically connected with the PCB circuit board and the brushless DC motor in turn, a rotating shaft of the brushless DC motor is detachably connected with the valve core through a connector; a color wheel is fixedly arranged on the rotating shaft, the light guide plate is positioned between the PCB circuit board and the color wheel; a light pipe A and a light pipe B are arranged on the light guide plate, and the light pipe A is positioned directly below the white LED lamp and the light pipe B is positioned directly below the color sensor; a white light of the white LED is irradiated onto the color wheel through the light pipe A, and a light of a corresponding color is reflected and transmitted to the color sensor through the light pipe B; the color sensor generates a corresponding electrical signal through the color of the received light and transmits the electrical signal to the PCB circuit board, and the PCB circuit board obtains an absolute position of the rotating shaft currently according to the received electrical signal and feeds the absolute position back to the controller; the controller controls the brushless DC motor to perform phase rotation to drive the connector and the valve core to selectively rotate forward and backward relative to the valve body, so as to realize multi-level control of water flow corresponding to the water outlet holes.

2. The electric shunt valve with multi-stage flow control according to claim 1, wherein the controller is a touch controller comprising a touch panel and a control circuit board; the touch panel is provided with a plurality of gear buttons, and the control circuit board is electrically connected with the PCB circuit board and the brushless DC motor in turn.

3. The electric shunt valve with multi-stage flow control according to claim 1, wherein a plurality of color blocks with different colors are uniformly arranged along a circumference of the color wheel, and the color blocks correspond to the gear buttons one by one.

4. The electric shunt valve with multi-stage flow control according to claim 1, further comprising a waterproof case for accommodating the brushless DC motor and the PCB circuit board; the waterproof case is installed in the valve body and comprises a box body and a cover body, and an O-shaped sealing ring is arranged between the cover body and the box body.

5. The electric shunt valve with multi-stage flow control according to claim 3, wherein the valve body is matched with a lock nut to clamp and fix the waterproof case between the valve body and the lock nut.

6. The electric shunt valve with multi-stage flow control according to claim 4, wherein a bottom of the waterproof case is provided with a connecting through hole, and the valve core is provided with a connecting part, which penetrates through the connecting through hole and is connected with the connector.

7. The electric shunt valve with multi-stage flow control according to claim 5, wherein a sealing ring is arranged between the connecting part of the valve core and the connecting through hole of the waterproof case.

\* \* \* \* \*